United States Patent [19]
Davis et al.

[11] Patent Number: 6,078,898
[45] Date of Patent: Jun. 20, 2000

[54] SYSTEM AND METHOD OF TRANSACTIONAL TAXATION USING SECURE STORED DATA DEVICES

[75] Inventors: Robert R. Davis; Jane B. Walton, both of Austin, Tex.

[73] Assignee: Schlumberger Technologies, Inc., Del.

[21] Appl. No.: 09/040,677

[22] Filed: Mar. 18, 1998

Related U.S. Application Data

[60] Provisional application No. 60/041,270, Mar. 20, 1997.

[51] Int. Cl.[7] ............................ G06F 19/00; G06F 17/60; G06F 15/02
[52] U.S. Cl. .............................. 705/19; 705/26; 705/27; 705/40; 705/42; 705/31
[58] Field of Search .................................. 705/35, 40, 30, 705/4, 36, 37, 31, 39, 26, 27, 19, 42; 735/380, 487, 492; 380/23, 24

[56] References Cited

U.S. PATENT DOCUMENTS

| | | |
|---|---|---|
| 4,575,621 | 3/1986 | Dreifus . |
| 4,736,294 | 4/1988 | Gill et al. ............................. 364/408 |
| 4,890,228 | 12/1989 | Longfield . |
| 5,335,169 | 8/1994 | Chong ...................................... 364/408 |
| 5,644,724 | 7/1997 | Cretzler .................................. 395/219 |
| 5,724,523 | 3/1998 | Longfield . |
| 5,745,706 | 4/1998 | Wilfberg et al. ....................... 395/235 |
| 5,819,249 | 10/1998 | Dohanich et al. ...................... 706/46 |
| 5,875,433 | 2/1999 | Francisco et al. ....................... 705/26 |
| 5,878,141 | 3/1999 | Daly et al. ................................. 380/4 |
| 5,878,400 | 3/1999 | Carter, III .............................. 705/20 |
| 5,884,283 | 3/1999 | Manos ...................................... 705/30 |
| 5,918,213 | 6/1999 | Bernard et al. ......................... 705/26 |

FOREIGN PATENT DOCUMENTS

| | | |
|---|---|---|
| 0 564 832 A1 | 10/1993 | European Pat. Off. . |
| 08180262 | 7/1996 | Japan . |

*Primary Examiner*—Tod R. Swann
*Assistant Examiner*—Pedro R. Kanof
*Attorney, Agent, or Firm*—Danita J. M. Maseles; Pehr B. Jansson

[57] ABSTRACT

A system for transactional taxation includes a secure stored data device, such as a smart card, having means for storing purchaser-specific data, an interface device for communicating with the secure stored data device and means for determining a tax rate on a purchase using the purchaser-specific data.

47 Claims, 8 Drawing Sheets

SYSTEM AND METHOD OF TRANSACTIONAL TAXATION USING SECURE STORED DATA DEVICES

Under 35 U.S.C. §119 (e), this application claims benefit of prior U.S. provisional application Ser. No. 60/041,270, filed Mar. 20, 1997.

TECHNICAL FIELD

This invention relates in general to the field of secure stored data devices, and more particularly to a system and method of transactional taxation using secure stored data devices.

BACKGROUND OF THE INVENTION

Taxation generally has two purposes-raising government revenue and satisfying social goals. There are three general categories of taxes: income, excise, and transaction, although excise taxes might be considered a type of transactional tax. Current transactional taxes are predominately flat-rate taxes. Flat-rate taxes are variously perceived as being simple (one rate, easy to calculate), and/or unfair (those who are unable to save pay a larger portion of disposable income than those who are able to save). The latter argument is generally addressed by exemptions from taxation; for example, by exempting basic necessities. Other exemptions, such as those for farm use items or for non-profit organizations, are instituted to meet social objectives.

Transactionaltaxes are increasingly favored for three reasons. First they are a step in departure away from the "honor plus audit" system used for income taxes. While transactionaltaxes can still be under-reported and underpaid, the system as a whole is perceived as "less leaky," since taxes are collected and remitted by a smaller number of entities, and these entities have more to lose by subverting the system. Second, the transactional system as a whole is perceived as simpler and more manageable because it is collected at the point of activity. The administrative burden for the system is concentrated at the business entity level, which is equipped to handle such a burden. Finally, transactional taxes can be increased fairly easily compared to income taxes. Since transactional taxes are levied on a large base of activity, a small rate increase produces great impact. Income tax rates are already perceived to be high, and so tax increases are generally achieved by tuning exemptions, deductions and the like, a much more complicated process.

The most common transactional tax is sales tax, levied on the purchaser of a non-exempt item, and collected by the seller at the point of sale. Sales taxes can be levied on both goods and services. The taxing authority defines the mix of exempt and non-exempt transactions to meet goals of equity and social policy.

Taxing authorities, such as states in the U.S., require that every business conducting transactions be licensed or permitted, and usually charge a fee for the right to conduct transactions. Each business is supplied with information about their responsibility to collect and remit the tax, and the procedure for doing so. Businesses are required to maintain an "audit trail" that documents each individual transaction, including whether the item sold was exempt or non-exempt and the amount and date of the transaction.

In addition to maintaining transaction-level information, each business is responsible for summarizing this information periodically, reporting it to the State, and remitting the corresponding tax revenue.

Perhaps the primary drawback of flat-rate transactional taxes is the lack of a flexible mechanism in their application to individual circumstances. The very simplicity that makes them administratively desirable has made them socially troublesome. This has been an impediment in instituting a U.S. transactional tax system, and has discouraged the states from relying on sales taxes more heavily.

One of the presumed benefits of a progressive income tax system is the ability to distribute more of the responsibility for government's cost on those more able to pay. This same progressive nature could be beneficial in a sales tax, assessing higher rates for higher cumulative purchases over some time period. However, since there has been no acceptable mechanism to accumulate an individual's purchases during a given time period, such a system has been impractical. Implementing such a system based on current infrastructure technology would be burdensome and error prone. Further, any such system that did not have built-in security of identity would be subject to easy manipulation by those desiring to minimize their transactional tax rate.

Therefore, a need has arisen for a transactional tax system which does not have to rely on a flat rate. A further need exists for a transactional tax system which can be progressive. A further need exists for transactional tax system which can have the flexibility to adjust for individual circumstances. A further need exists for transactional tax system which can have the flexibility to adjust for socially desirable goals. A further need exists for transactional tax system which, while it can be used progressively or otherwise achieve socially desirable goals, is still accurate and simple to operate. A further need exists for a transactional tax system which is tamper resistant. A further need exists for a transactional tax system which does not compromise the privacy of the individual.

SUMMARY OF THE INVENTION

In accordance with the present invention, a transactional tax system and method is provided that substantially eliminates or reduces the disadvantages and problems associated with the previously developed transactional tax systems.

The invention provides for a system for transactional taxation which includes a secure stored data device storing purchaser-specific data, an interface device for communicating with the secure stored data device and a way of determining a tax rate on a purchase using the purchaser-specific data. The purchaser-specific data may include a purchase history of the purchaser, his tax classification, geographic location of his domicile, an indication of social benefits eligibility or eligibility to make a restricted purchase, or identity verification information. Such identity verification information may include a personal identification number, a password, a digitized signature or biometric information, such as a digitized fingerprint or retinal pattern. The system may include a network, including means for ascertaining the pre-tax purchase price and means for communicating with the interface device. The network may be a point of sale network, including a cash register terminal for ascertaining the pre-tax purchase amount and a display for displaying purchase information. The network may be electronically assessable to potential purchasers, such as through the Internet. The interface device may include an identity verification input or the identity verification input may be a separate element or be part of the network.

This invention may also provide for a tax server with storage for tax-related information and which can communicate with either the network or interface device. This means that it can communicate, at least indirectly, with the secure stored data device. The invention may provide a way of storing tax rate structure information. This may be on the secure stored data device, the interface device, the tax server or the network. The tax rate structure information may be downloadable from the tax server. The tax rate structure information may be in the form of a tax rate table. The tax-related data stored on the tax server may also include accumulated tax collection information. The network may collect and store accumulated tax collection information and may upload this information to the tax server.

The invention may also provide for the secure stored data device to support multiple applications, in addition to supporting the transactional taxation application.

The invention may also provide for a system for transactional taxation which includes a secure stored data device storing purchaser-specific data, the purchaser-specific data including a purchase history of the purchaser; and identity verification information, an interface device for communicating with the secure stored data device, having an identification verification input, a network, which ascertains the pre-tax purchase price, collects accumulated tax collection information, and communicates with the interface device, a tax server storing accumulated tax collection information uploaded form the network over a communication line and a way of determining a tax rate on a purchase using the purchaser-specific data and stored tax rate structure information.

The invention also provides for a method of transactional taxation including the steps of ascertaining a pre-tax purchase amount for a purchase and using the pre-tax purchase amount and purchaser-specific data stored on a secure stored data device to determine a tax rate for the purchase. The method may also include the step of verifying the identity of a purchaser using information stored on a secure stored data device prior to determining the tax rate. The method may also include the step of ascertaining the eligibility of the purchaser to make the purchase using information stored on a secure stored data device prior to determining the tax rate. The method may also include the step of collecting and storing accumulated tax collection information. The method may also include the step of accepting electronic payment of the tax.

The invention also provides for a method of transactional taxation including the steps of ascertaining the identity of a purchaser using information stored on a secure stored data device, ascertaining the eligibility of the purchaser to make the purchase using information stored on a secure stored data device, ascertaining the pre-tax purchase amount and sending the pre-tax purchase amount to a secure stored data device, using an executable program stored in a memory of the secure stored data device to add the pre-tax purchase amount to a total purchase history amount of the purchaser to obtain a new total purchase history amount and to compare the new total purchase history amount to a tax rate table stored in the memory of the secure stored data device to ascertain a tax rate, using the tax rate to determine a tax amount and a total purchase price, and communicating the total purchase amount to the purchaser. The method may also include the step of updating tax rate structure information. The method may also include the step of collecting and storing accumulated tax collection information. The method may also include the step of accepting electronic payment of the tax.

An advantage of the present invention is that it provides for a transactional tax system which does not have to rely on a flat tax rate, but which is still simple and accurate.

Another advantage of the present invention is it allows for a progressive transactional tax system.

Another advantage of the present invention is that it allows for a transactional tax system which has the flexibility to adjust for individual circumstances.

Another advantage of the present invention is that it allows for a transactional tax system which can achieve socially desirable goals.

Another advantage of the present invention is that it allows for a transactional tax system which is tamper resistant.

Another advantage of the present invention is that it allows for a transactional tax system that does not compromise the privacy of the individual.

DESCRIPTION OF EMBODIMENTS OF THE INVENTION

The above-noted and other aspects of the present invention will become more apparent from a description of the preferred embodiment, when read in conjunction with the accompanying drawings. The drawings illustrate a preferred embodiment of the invention. In the drawings, the same members have the same reference numerals.

1. A Simple Transactional Tax System

Figure 1:
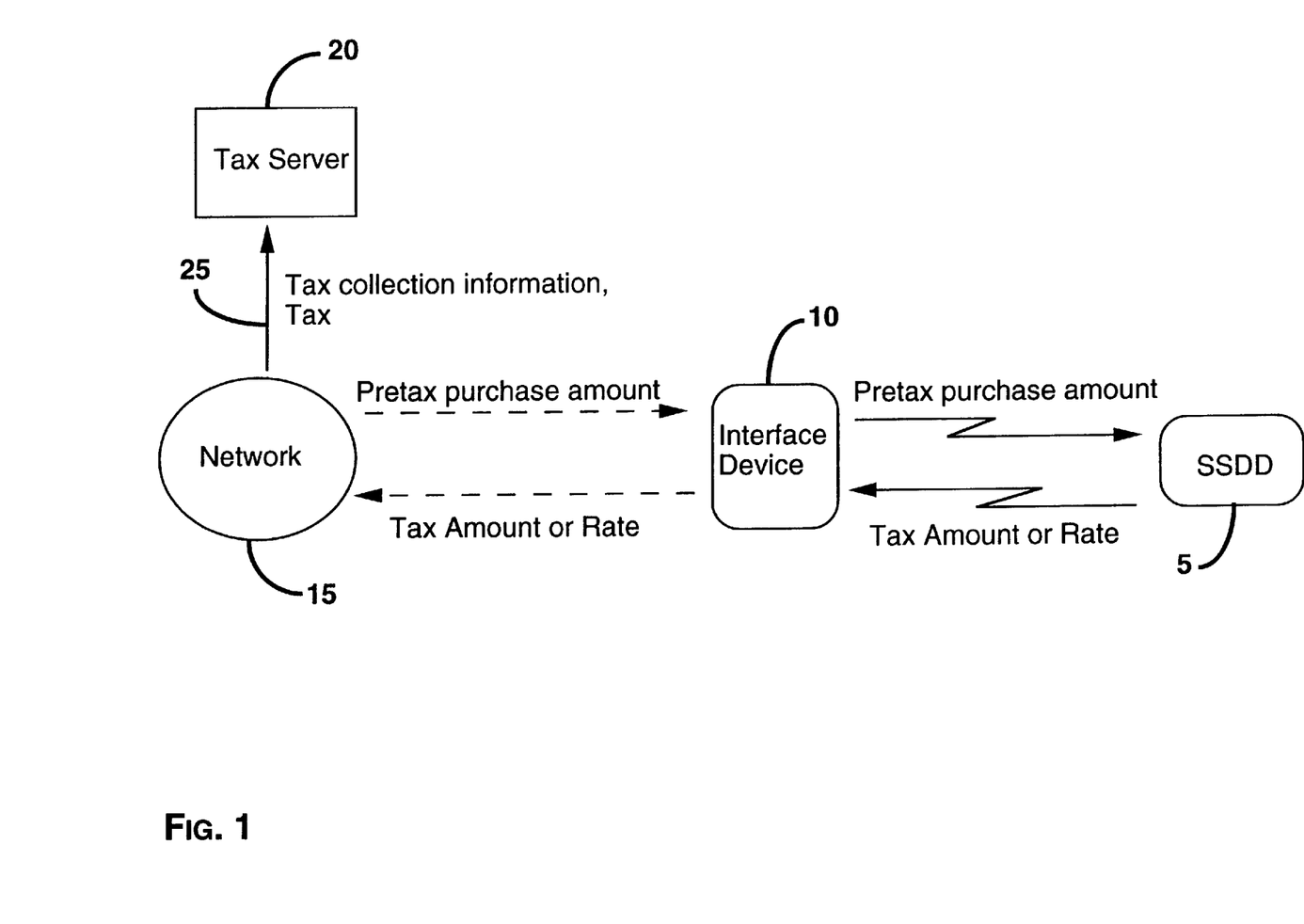
FIG. 1 is a block diagram illustrating a simple transactional tax system in accordance with the present invention.

A simple transactional tax system using a Secured Stored Data Device ("SSDD") is illustrated in FIG. 1. The SSDD 5 could take one of a number of forms, including but not limited to an integrated circuit card (also known as a "smart card"), a Personal Digital Assistant ("PDA") or an electronic purse or wallet. The SSDD 5 has a microcontroller or some other electronic device which has a memory for storing software and/or data. The memory in the SSDD 5 stores information specific to the purchaser (or group of purchasers), such as the purchase history of the purchaser ("purchaser-specific data"). The SSDD 5 is preferably portable, so that the SSDD 5 can be carried by the purchaser while shopping, either at physical shopping locations or while shopping over an electronic system such as the Internet. An advantage of such a SSDD is that it is possible for the SSDD to support multiple applications. The SSDD, as is known in the art, has inherent security which prohibits unauthorized tampering with information stored on the SSDD.

Figure 2A:
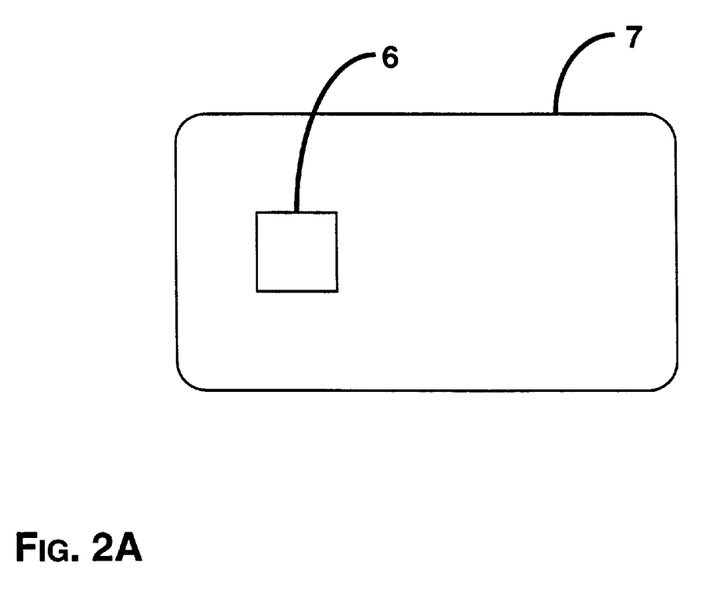
FIGS. 2A and 2B are block diagrams illustrating a smart card SSDD and its microcontroller in accordance with the present invention.
Figure 2B:
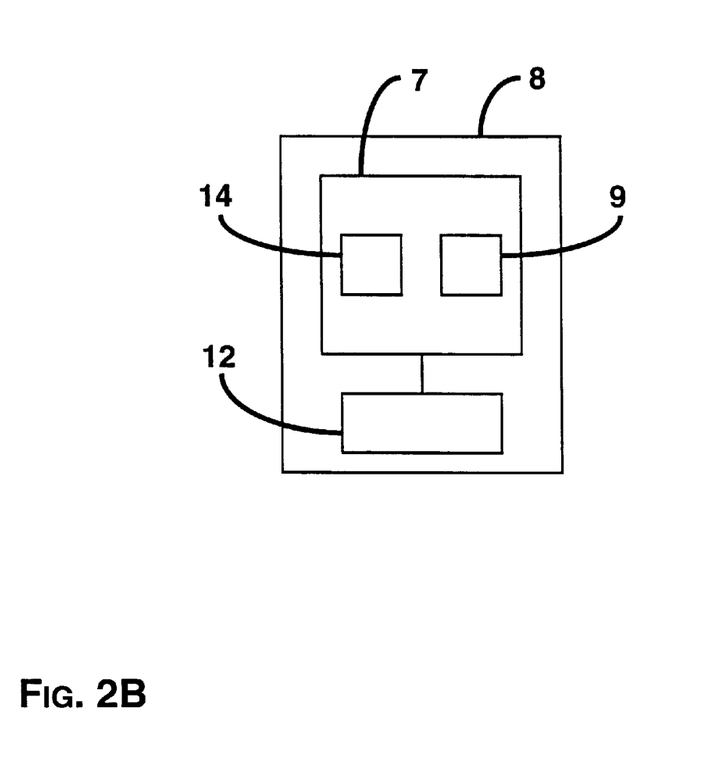

A smart card 6 SSDD in accordance with the present invention is illustrated in FIGS. 2A and 2B. The smart card 6 has a microcontroller 7 with a memory 8 which stores purchaser-specific data 9, which may include a purchase history of the purchaser. The memory also stores software 11. The memory 8 may also store other information. The memory 8 in the microcontroller 7 is connected to a communicator 12.

The purchaser-specific data stored on the SSDD 5 is used to assess a transactional tax. As illustrated in FIG. 1, when a purchase begins, the communicator 12 (see FIG. 2) in the SSDD 5 communicates with an interface device (or "IF device") 10. For example, for a smart card SSDD, the interface device 10 would be a smart card reader. The interaction between the SSDD 5 and the interface device 10 could either take place through physical insertion of the SSDD 5 into the interface device 10 ("contact") or could be contact-less, interacting through radio frequency or infrared transmission or any other reliable transmission mechanism. The SSDD 5 and the interface device 10 exchange information which establishes the transactional tax rate to be assessed for the particular purchaser for the transaction.

In the preferred embodiment illustrated in FIG. 1, the interface device 10 communicates with a sales network 15, which may include a point of sale system, an enterprise system or other system. The network 15 may include a cash register terminal or a plurality of cash register terminals connected to a computer system with a network memory. The network may be an electronic shopping network, accessible to purchasers electronically, such as over the Internet. In alternative embodiments, the interface device may be an integral part of the network.

In the preferred embodiment illustrated in FIG. 1, the network 15 assesses the pre-tax purchase amount and electronically transmits the pre-tax purchase amount to the SSDD 5 via the interface device 10. Alternatively, the pre-tax purchase amount could be keyed into the interface device 10 manually. In still other embodiments, the network may also send additional information such as a classification of the type of goods or services purchased to the SSDD.

In a preferred embodiment, the SSDD 5 also has identity verification capabilities. To verify identity, the SSDD 5 stores a Personal Identification Number (PIN) in its memory. The interface device may include an identity verification input or the identity verification input may be a separate element or be part of the network. The purchaser would have to key in the correct PIN number into the identity verification input in order to use the SSDD. In other embodiments of the invention, alternatively or in addition to the PIN, the SSDD 5 carries digitized signature information or digitized biometric information about the purchaser, such as a digitized fingerprint or retinal pattern or other information used to verify identity. The SSDD 5 could also have a picture of the purchaser printed on its surface. With its multiple application capabilities, the SSDD 5 could be issued by the state or other government entity and combine its tax functions with those of a driver's license, welfare card, medical or other benefits card, visa or other government-issued card.

In addition to the purchaser-specific data, in the embodiment of the invention illustrated in FIG. 1, the memory in the SSDD 5 stores tax rate structure information and software necessary for calculating the purchaser's tax rate and/or tax amount for a specific transaction. The software in the SSDD uses the tax rate structure information to determine the tax rate and tax amount based on purchaser-specific data and the pre-tax purchase amount. In alternative embodiments, the additional information sent by the network 15, such as the classification of goods, may also be used in this determination, with different classes of goods being taxed at different rates. The SSDD 5 then sends the tax rate and/or tax amount via the interface device 10 to the network 15.

In alternative embodiments, the SSDD 5 merely sends information about the purchaser to the interface device and the tax determination is performed by a network software in the network or an IF software in the interface device. The information about the purchaser could be her tax classification, which might be based on her income, or could be the total of her accumulated purchases throughout the year or any other information which could be used to assess her tax. In such alternative embodiments, the tax rate structure information could be stored in the interface device or in the network.

The network 15 adds the tax amount to the pre-tax purchase price and communicates the total purchase amount to the seller and/or purchaser. For example, the total price could be displayed at a cash register terminal of the network or on the computer screen of the purchaser if she is shopping over the Internet. Alternatively, the calculation of the total purchase price could be made by the SSDD or by the interface device.

In a preferred embodiment, a network memory in the network 15 stores the tax rate structure information and/or accumulated tax collection information. A tax server 20 updates the tax rate structure information and/or collects and accumulates tax collection reporting information. The tax server 20 communicates with the network 15 over a secure communication line 25. The secure communication line 25 could be a telephone line, but could also be any kind of communication line, the security of which could be enhanced if necessary, for example through encryption. The tax collection reporting information can be sent from the network 15 to the tax server 20 with each transaction or on a periodic basis. The taxes collected could also be transmitted to the tax server 20 of the taxing authorities electronically, with each transaction or on a periodic basis.

In other embodiments, the tax rate structure information and/or tax collection information could be stored on a IF memory inside the interface device, which could communicate with the tax server 20, either directly or via the network.

The purchaser-specific data may include geographic locale information, which would enable electronic collection of tax to be allocated to a plurality of taxing jurisdictions, based upon negotiated allocations among the taxing authorities or decisions regarding the taxation of Internet commerce.

2. A Progressive Implementation

Figure 3:
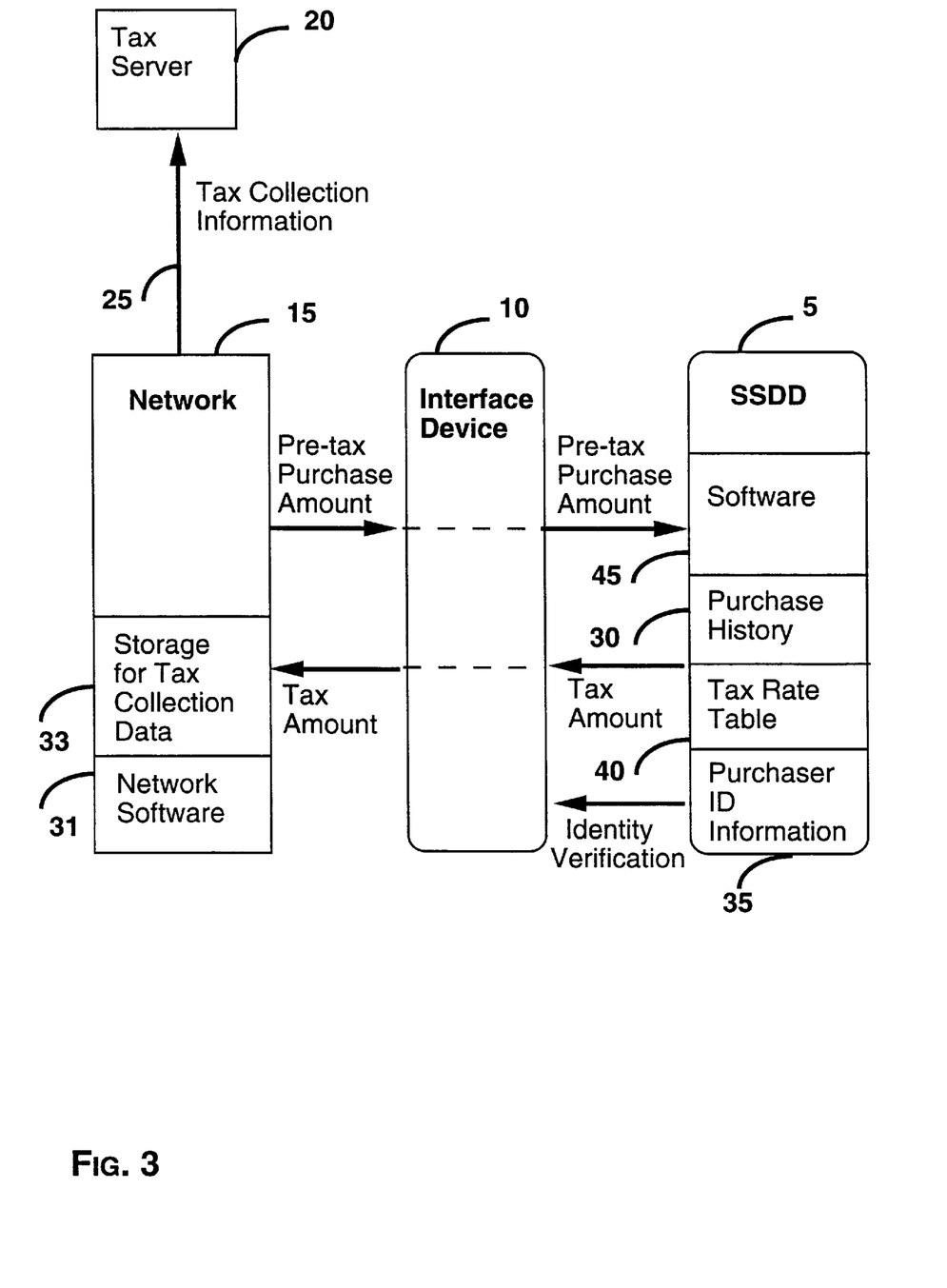
FIG. 3 is a block diagram illustrating a transactional tax system in accordance with the present invention.

A transactional tax system using the SSDD in accordance with the present invention implements a progressive tax as illustrated in FIG. 3. The memory in the SSDD 5 stores a purchase history 30 of the purchaser and the SSDD 5 also has identity verification capabilities, with purchaser identity information 35. The purchase history 30 covers some specific period of time, in this embodiment a year, that would allow placement of the purchaser on a progressive tax rate table 40 according to his purchase history. The SSDD 5 stores the purchaser's cumulative purchase amount during the current year, with the amount reset annually. Alternatively, some other time period could be used, purchases of special categories of goods, such as luxury goods or socially less desirable goods like alcoholic beverages or tobacco products, could be aggregated, or the SSDD could maintain a rolling average for some period of time. In the embodiment illustrated in FIG. 3, the tax rate table 40 is also stored on the SSDD 5. The tax rate table 40 could be updated periodically or at each transaction by downloading the information from the tax server 20 via the interface device 10, via the network 15 and interface device 10. Alternatively, the tax rate table 40 could be updated by periodically issuing new SSDDs with the current tax rate tables stored in their memory.

In the embodiment illustrated in FIG. 3, the pre-tax purchase price is ascertained at the time of purchase. The purchaser inserts the SSDD 5 into the interface device 10. The interface device 10 communicates with the SSDD 5, verifying the identity of the purchaser. The network 15 sends the pre-tax purchase amount to the SSDD 5 via the interface device 10. Software 45 in the SSDD 5 adds the pre-tax purchase amount to the purchaser's cumulative amount in the purchase history 30. The software 45 compares the new total cumulative amount to the tax rate table 40 and determines the tax rate for the purchase. In this embodiment, the tax rate table 40 is configured so that the higher the purchaser's cumulative purchase amount in the purchase history, the higher the tax rate on the current purchase. As the purchases aggregate over the year, the purchaser pays higher levels of tax on each new purchase. The software 45 in the SSDD 5 multiplies the tax rate by the pre-tax purchase amount to calculate the tax amount. The SSDD 5 sends the tax amount via the interface device 10 to the network 15. The network software 31 in the network 15 calculates the total purchase price by adding the tax amount and the pre-tax purchase amount and communicates the total purchase price to the purchaser. In other embodiments, the SSDD 5 may add the tax amount to the pre-tax purchase amount and send the total purchase price to the network 15 via the interface device 10.

In the preferred embodiment illustrated in FIG. 3, the network 15 accumulates tax collection information in the network memory 33 and transmits it to tax server 20 over the secure communication line 25.

The taxing authority could select how to handle purchases made by purchasers without an SSDD. The taxing authority could forbid all or only certain purchases made without a SSDD. Forbidding a purchase might be particularly advantageous if the purchase is for goods or services which can only be legally purchased by an adult, given the identity verification capabilities of the SSDD. Alternatively or in addition to restricting purchases without an SSDD, the taxing authority could require that the tax paid on purchases without a SSDD be the maximum tax rate.

The requirement of a SSDD for purchases could be also used to prevent certain purchases to particular persons. For example, information stored on the SSDD could indicate that a person convicted of drunk driving, as well as those not yet of age, would be ineligible for purchases of alcoholic beverages. Similarly, a person convicted of a felony could have an SSDD which carried information showing that the felon is not eligible to purchase a firearm.

Figure 4:
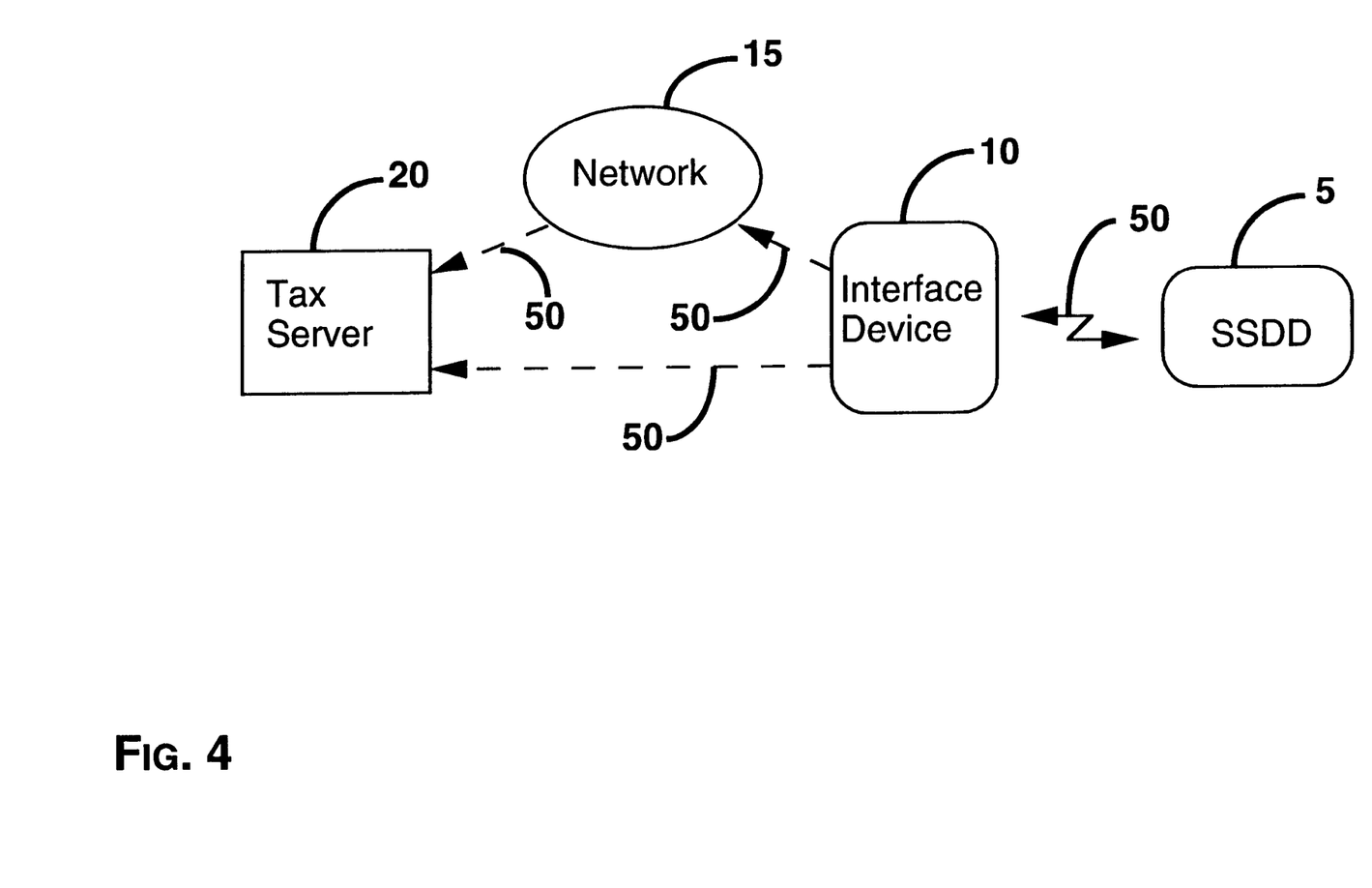
FIG. 4 is a block diagram illustrating the lines of communication in a transactional tax system in accordance with the present invention.

FIG. 4 illustrates lines of communication 50 between the SSDD 5, the interface device 10, the network 15 and the tax server 20 in a preferred embodiment of the invention. Note that the interface device 10 could communicate either directly with the tax server 20 or indirectly through the network 15.

Figure 5:
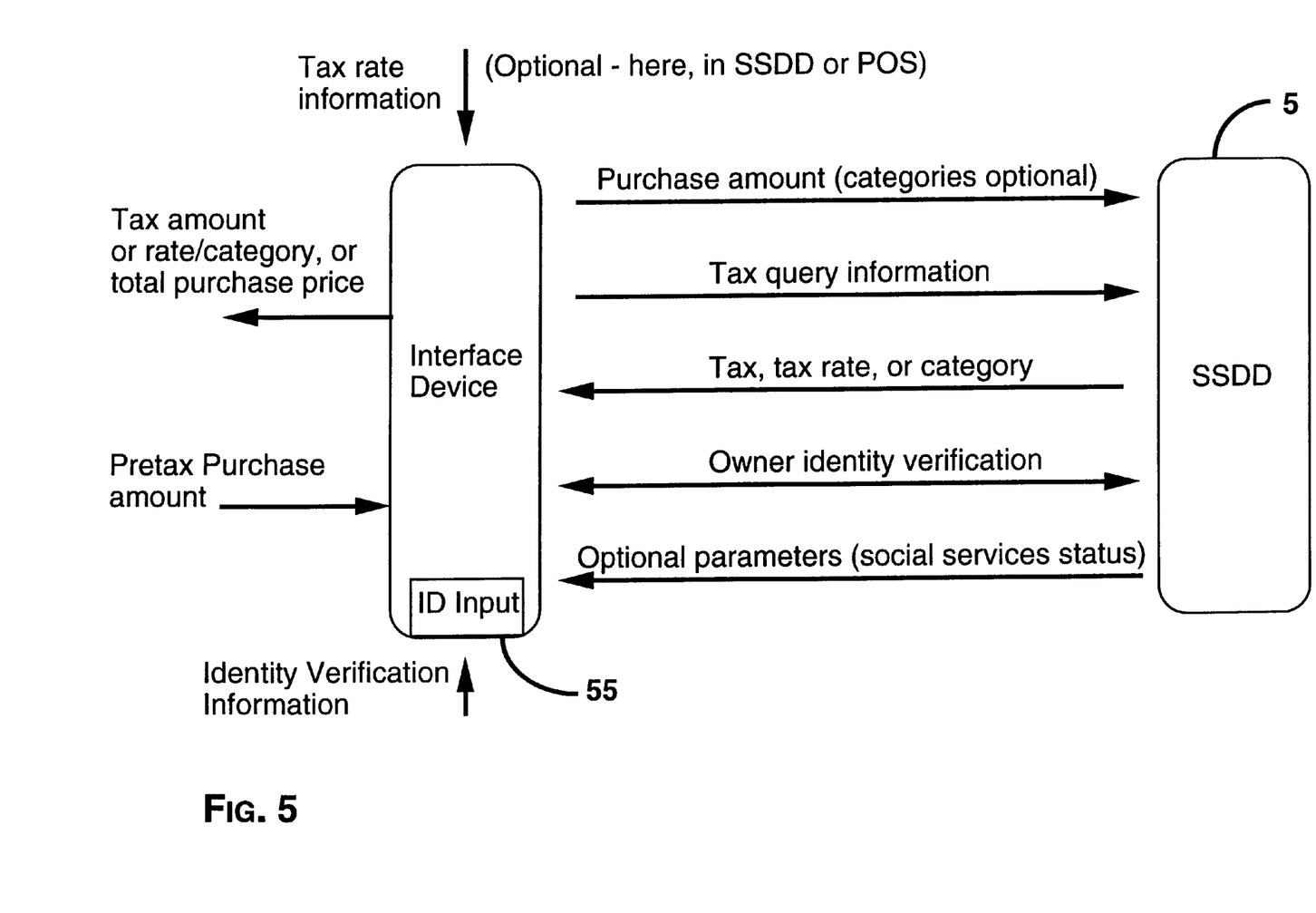
FIG. 5 is a block diagram illustrating a data transfer between a secure stored data device and an interface device in accordance with the present invention.

FIG. 5 illustrates examples of types of information that can be exchanged between the SSDD 5 and the interface device 10 of the present invention. The tax rate structure information may be stored on the SSDD 5, the interface device 10, the network 15 or on the tax server 20. The pre-tax purchase amount is sent from the interface device 10 to the SSDD 5. Classifications of goods being purchased and the pre-tax purchase amount for each class may also be sent from the interface device 10 to the SSDD 5. The interface device 10 sends a tax query to the SSDD 5. The tax query could initiate the transactional taxation process, verify the validity of the tax rate structure information stored on the SSDD, or download the current tax rate structure information on the SSDD.

As illustrated in FIG. 5, the SSDD 5 sends the information for verifying the purchaser's identity, the purchaser's tax classification or social services classification, the tax rate, the tax amount and/or the total purchase amount (pre-tax purchase amount plus the tax amount) to the interface device. The interface device 10 has an input 55 for identity verification. In alternative embodiments, the identity verification input 55 could be part of the network or a separate element of the system. The identity verification input 55 could be, for example, a keyboard for entry of a PIN number or password, an electronic scanner, an electronic signature capture device, a voice recognition system, or a biometric sensor input or any other input appropriate to the type of identity verification information stored in the SSDD 5. The interface device 10 sends the tax classification, tax rate, tax amount or total purchase amount, as received from the SSDD 5, to the network 15.

Figure 6:
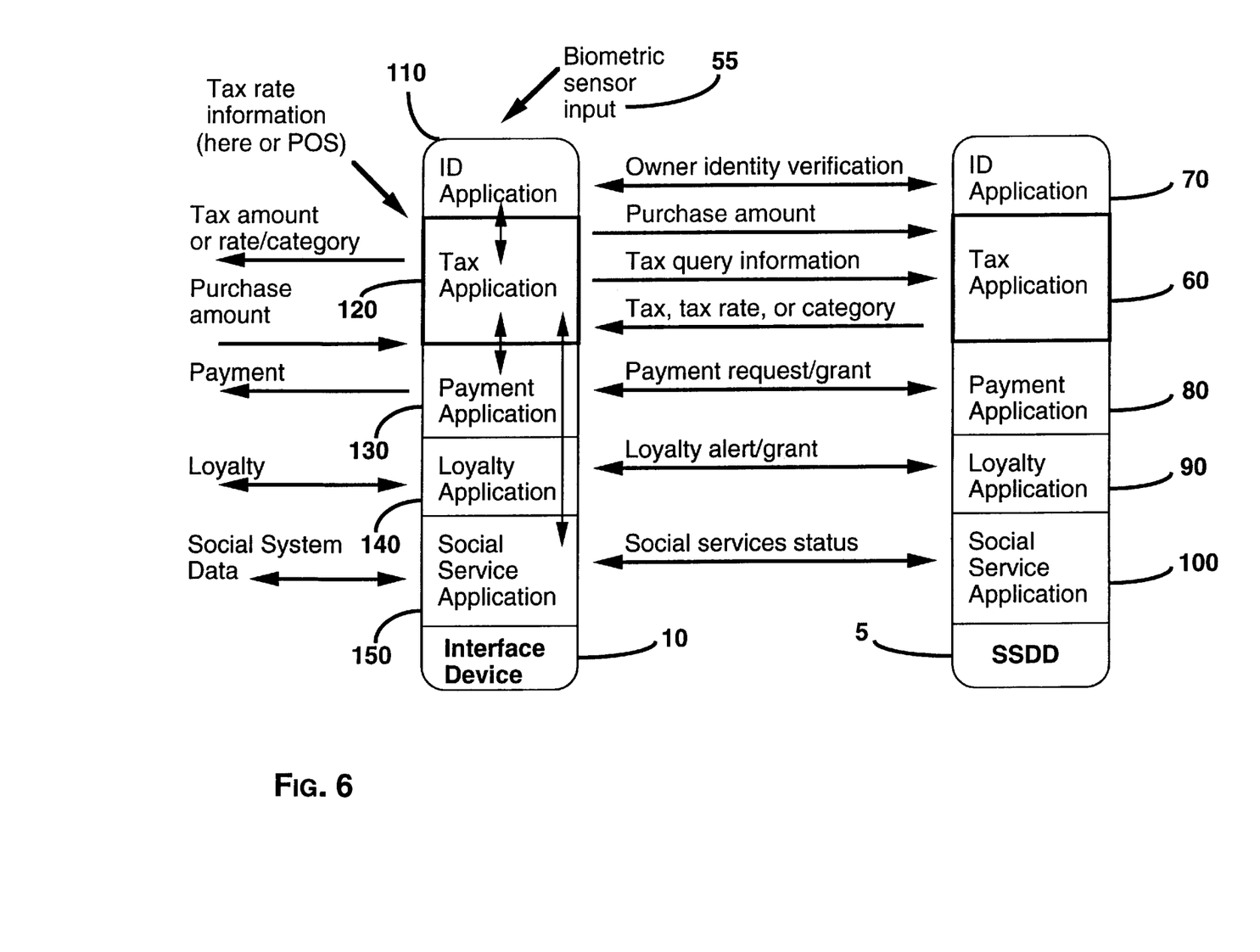
FIG. 6 is a block diagram illustrating a transactional tax system integrated on a multiple application secure stored data device in accordance with the present invention.

FIG. 6 illustrates a transactional tax system 60 along with other applications on a multiple application SSDD 5. Each application would have its own software and data storage on the SSDD 5 and on the interface device 10. As an alternative to having application software and data storage on the interface device, some or all of it could be on the network or available through servers. Applications illustrated as being on the SSDD 5 in the embodiment illustrated in FIG. 6 are the tax application 60, an identity application 70, a payment application 80, a loyalty application 90 and a social service application 100. Each application has corresponding software and data storage on the interface device 10: the tax application 120, the identity application 110, the payment application 130, the loyalty application 140, and the social service application 150. The identity application 70, 110 would allow the SSDD 5 to act as the primary identity verification for the purchaser. The payment application 80, 130 would allow the SSDD to act as a credit, debit or stored value card. Payment requests and grants could be communicated from the interface device 10 to the SSDD 5 and visa versa. The loyalty application 90, 140 could allow the purchaser to accumulate loyalty bonuses, such as frequent flyer miles or discounts on the SSDD. Loyalty alerts and grants could be communicated between the interface device 10 to the SSDD 5. Loyalty points could be stored and accumulated on the SSDD 5. The social service application 100, 150 could indicate the bearer's eligibility for certain services or programs and could grant exemption from certain taxes. The bearer's status and eligibility could be communicated between the interface device 10 to the SSDD 5. The interface device 10 sends updates on loyalty programs, social services, and payments to appropriate servers.

Figure 7:
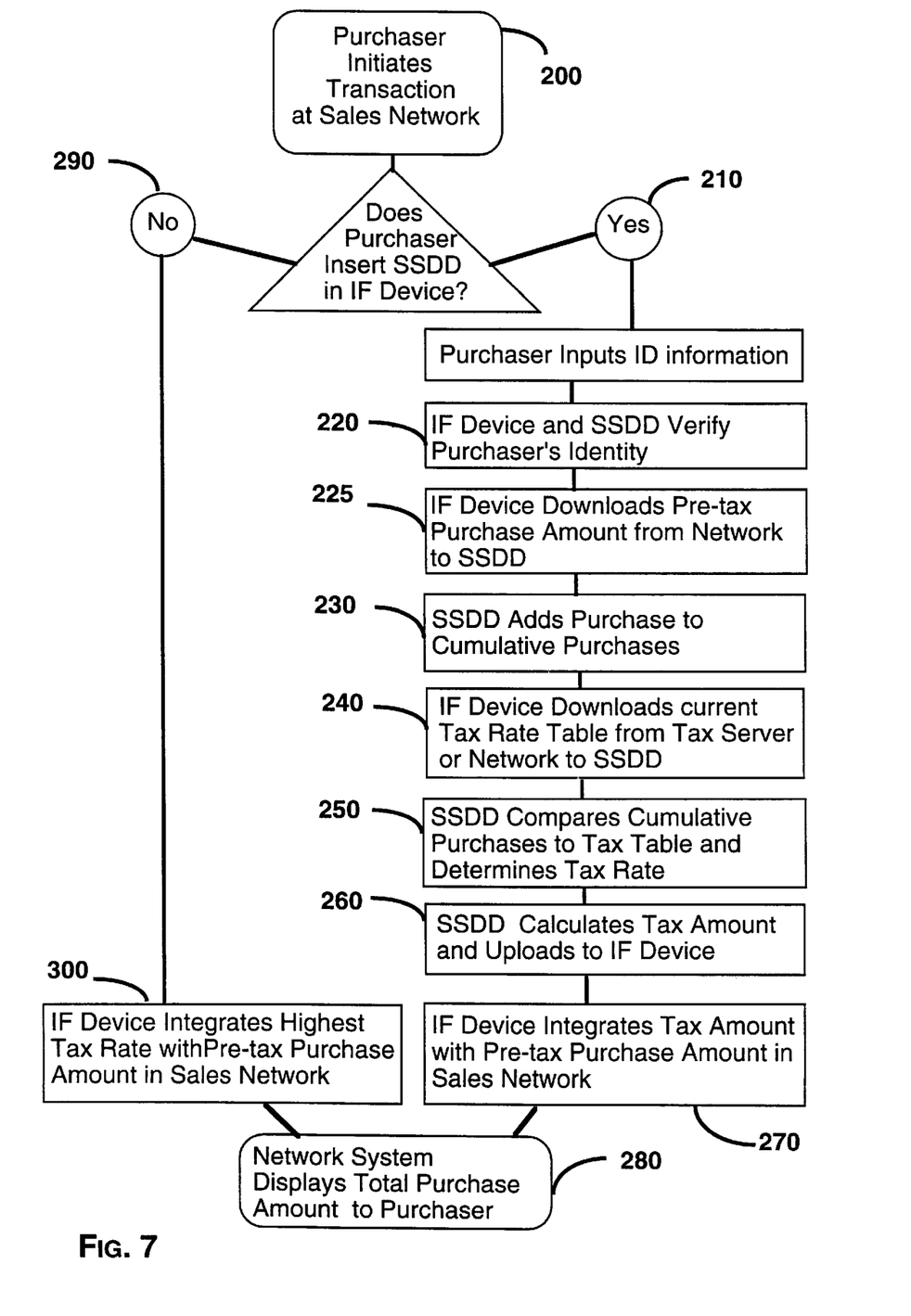
FIG. 7 is a flowchart illustrating a transactional tax transaction in accordance with the present invention.

FIG. 7 is a flowchart of a purchase procedure using the transactional tax system of an embodiment of the present invention. The purchaser initiates 200 a purchase at the point of sale network. If the purchaser inserts 210 the SSDD into the interface device, the purchaser also inputs identity information into the input of the interface device. The interface device and the SSDD verify 220 the purchaser's identity and eligibility to make the purchase. The interface device downloads 225 the pre-tax purchase amount from the network to the SSDD. The SSDD adds 230 the pre-tax purchase amount to the cumulative purchases stored on the SSDD. The interface device downloads 240 a current tax table from the tax server to the SSDD. The SSDD compares the new total cumulative purchase amount to the tax table and determines 250 a tax rate. The SSDD calculates a tax amount for the purchase and uploads 260 it to the interface device. The interface device sends the tax amount to the network and the network integrates the tax amount with the pre-tax purchase amount to determine 270 a total purchase amount. The network displays 280 the total purchase amount for the purchaser. If the purchaser did not have her SSDD or chose to make a purchase without her SSDD 290, the interface device would signal the network, which would use the highest tax rate to calculate 300 the tax amount and total purchase amount.

Figure 8:
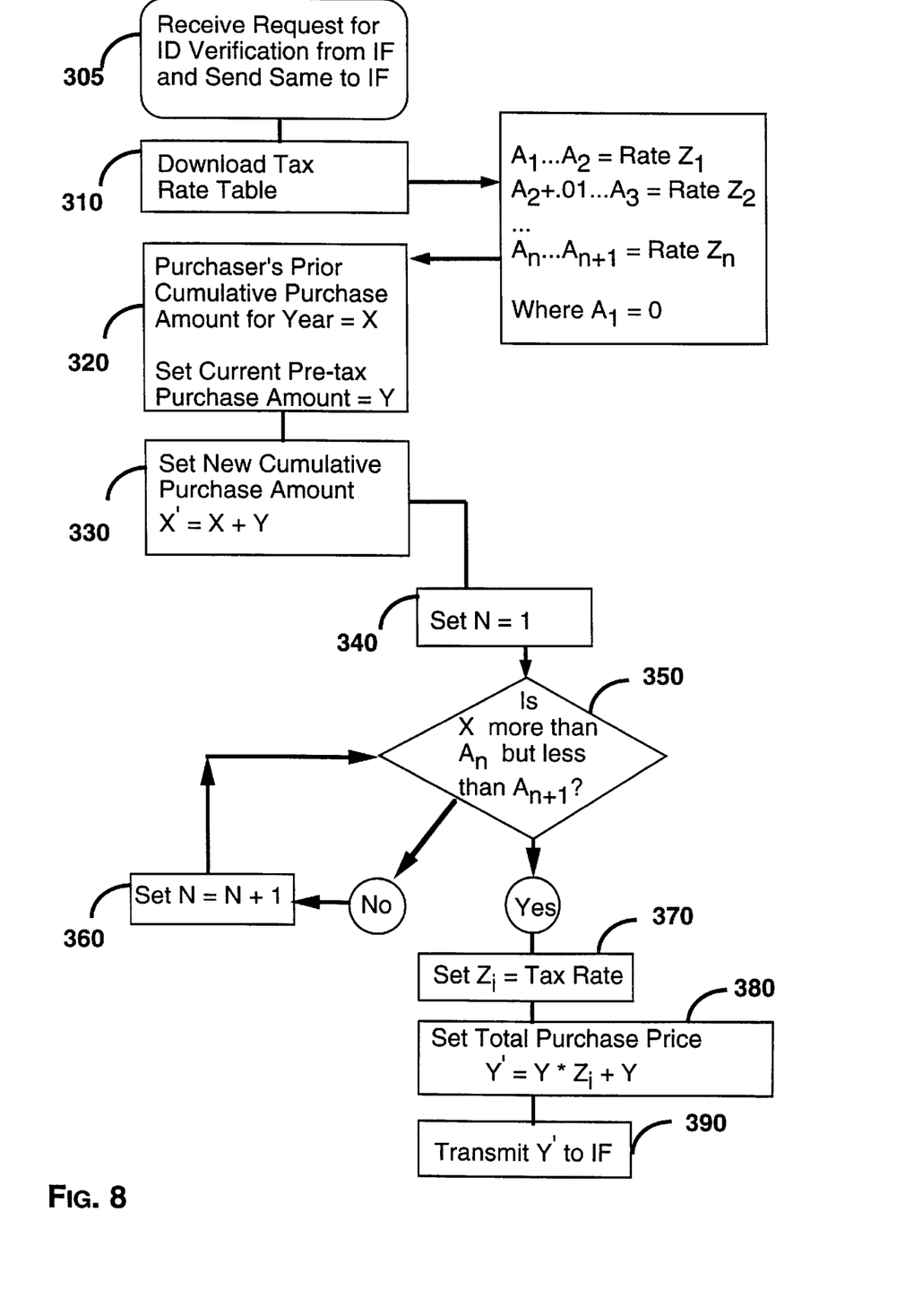
FIG. 8 is a flowchart illustrating an embodiment of software used to determine the transactional tax with the present invention.

FIG. 8 is a flowchart illustrating software on the SSDD in accordance with an embodiment of the present invention. The SSDD receives a request for identity verification information from the interface device and transmits 305 the identity verification information to the interface device. The SSDD receives 310 the tax rate table downloaded through the interface device. The tax rate table has different tax rates $Z_1, Z_2, \ldots Z_i$ for ranges of values $A_1$ through $A_2$, $A_2+\$0.01$ through $A_3, \ldots A_n$ through $A_{n+1}$ respectively. The SSDD receives the pre-tax purchase amount and sets 320 the pre-tax purchase amount to Y. The purchaser's cumulative purchase amount for the current year is X. The SSDD sets 330 the new cumulative purchase amount X' equal to X plus Y. The SSDD sets 340 n equal to 1. The SSDD compares 350 X' to $A_n$ and $A_{n+1}$ to see if X' falls between those values. If X' does not, the SSDD sets 360 n equal to n plus 1 and tries again. Once X' falls between $A_n$ and $A_{n+1}$, the SSDD sets 370 the corresponding $Z_i$ value to Z', the tax rate. The SSDD sets 380 the total purchase price Y' equal to Y multiplied by Z' then added to Y. The SSDD sends 390 Y' to the interface device. Alternatively, the SSDD could calculate the tax amount (equal to Y multiplied by Z') and send it to the interface device.

In operation, the transactional taxation system of the present invention uses SSDD and the interface device to create a flexible tax system which is accurate and easy to use, but which can also be used progressively or to advance social goals.

The benefits of the present invention include simplicity and accuracy. In addition, the present invention provides for a transactional tax system which can be progressive or which can achieve socially desirable goals. Furthermore, the present invention provides for a transactional tax system which has the flexibility to adjust for individual circumstances. Another benefit of the present invention is that it allows for a transactional tax system which is tamper resistant. Yet another benefit of the present invention is that it allows for a transactional tax system which does not compromise the privacy of the individual.

The principles, preferred embodiments, and modes of operation of the present invention have been described in the foregoing specification. The invention is not to be construed as limited to the particular forms disclosed, because these are regarded as illustrative rather than restrictive. Moreover, variations and changes may be made by those skilled in the art without departing from the spirit of the invention.

What is claimed is:

1. A system for transactional taxation comprising:
   a) a purchaser-carried secure stored data device having means for storing purchaser-specific purchase history;
   b) an interface device for communicating with the secure stored data device; and
   c) means for determining a tax rate on a purchase using the purchaser-specific purchase history.

2. A system for transactional taxation as in claim 1, wherein:
   the purchaser-specific data includes a purchase history of the purchaser.

3. A system for transactional taxation as in claim 1, wherein the purchaser-carried secure stored data device further comprises:
   purchaser-specific data including identity verification information.

4. A system for transactional taxation as in claim 3, wherein:
   the identity verification information comprises a personal identification number.

5. A system for transactional taxation as in claim 3, wherein:
   the identity verification information comprises a password.

6. A system for transactional taxation as in claim 3, wherein:
   the identity verification information comprises biometric information.

7. A system for transactional taxation as in claim 6, wherein:
   the biometric information comprises a digitized fingerprint.

8. A system for transactional taxation as in claim 6, wherein:
   the biometric information comprises a digitized retinal pattern.

9. A system for transactional taxation as in claim 1, wherein the purchaser-carried secure stored data device further comprises:
   purchaser-specific data including a tax classification.

10. A system for transactional taxation as in claim 1, wherein the purchaser-carried secure stored data device further comprises:
    purchaser-specific data including an indication of social benefits eligibility.

11. A system for transactional taxation as in claim 1, wherein the purchaser-carried secure stored data device further comprises:
    purchaser-specific data including an indication of eligibility to make restricted purchases.

12. A system for transactional taxation as in claim 3, further comprising:
    an identity verification input used with the identity verification information to verify identity of the purchaser.

13. A system for transactional taxation as in claim 1, further comprising:
    a network, including means for ascertaining the pre-tax purchase price and means for communicating with the interface device.

14. A system for transactional taxation as in claim 13, wherein:
    the network includes a point of sale network.

15. A system for transactional taxation as in claim 14, wherein:
    the point of sale network includes a cash register terminal for ascertaining the pre-tax purchase amount.

16. A system for transactional taxation as in claim 15, wherein:
    the cash register terminal includes a display for displaying purchase information.

17. A system for transactional taxation as in claim 13, wherein:
the network is electronically accessible to potential purchasers.

18. A system for transactional taxation as in claim 17, wherein:
the network is electronically accessible to potential purchasers over the Internet.

19. A system for transactional taxation as in claim 1, wherein:
the means for determining the tax rate on purchases includes means for storing tax rate structure information.

20. A system for transactional taxation as in claim 19, wherein:
the means for storing tax rate structure information is in the secure stored data device.

21. A system for transactional taxation as in claim 19, wherein: the means for storing tax rate structure information is in the interface device.

22. A system for transactional taxation as in claim 13, wherein:
the means for determining the tax rate on purchases includes means for storing tax rate structure information.

23. A system for transactional taxation as in claim 22, wherein:
the means for storing tax rate structure information is in the network.

24. A system for transactional taxation as in claim 13, further comprising:
a tax server having means for storing accumulated tax collection information; and having a tax server-network communication means.

25. A system for transactional taxation as in claim 24, wherein:
the means for determining the tax rate on purchases includes means for storing tax rate structure information in the tax server.

26. A system for transactional taxation as in claim 25, wherein:
the tax rate structure information is stored on and is downloadable from the tax server.

27. A system for transactional taxation as in claim 1, further comprising:
a tax server for storing tax-related data and having a means for communicating with the secure stored data device.

28. A system for transactional taxation as in claim 19, wherein:
the tax rate structure information comprises a tax rate table.

29. A system for transactional taxation as in claim 27, wherein:
the tax-related data comprises accumulated tax collection information.

30. A system for transactional taxation as in claim 13, wherein:
the network has a means for collecting and storing accumulated tax collection information.

31. A system for transactional taxation as in claim 24, wherein:
the network includes a means for collecting and storing accumulated tax collection information and a means for uploading the accumulated tax collection information to the tax server.

32. A system for transactional taxation as in claim 1, wherein:
the secure stored data device supports multiple applications.

33. A system for transactional taxation as in claim 3, wherein:
the identity verification information comprises a digitized signature.

34. A system for transactional taxation as in claim 27, wherein:
the tax server's means for communicating with the secure stored data device is indirect.

35. A system for transactional taxation comprising:
a) a secure stored data device having means for storing purchaser-specific data, the purchaser-specific data including:
  i) a purchase history of the purchaser;
  ii) an identity verification information;
b) an interface device for communicating with the secure stored data device;
c) an identification verification input;
d) a network, including a means for ascertaining the pre-tax purchase price, a means for collecting accumulated tax collection information, and a means for communicating with the interface device;
e) a tax server having a means for storing accumulated tax collection information uploaded form the network over a tax server-network communication means; and
f) a means for determining a tax rate on a purchase using the purchaser-specific purchase history of the purchaser, including means for storing tax rate structure information.

36. A method of transactional taxation comprising the steps of:
a) ascertaining a pre-tax purchase amount for a purchase; and
b) using the pre-tax purchase amount and a purchaser-specific purchase history stored on a secure stored data device to determine a tax rate for the purchase.

37. A method of transactional taxation as in claim 36, further comprising the step of:
verifying the identity of a purchaser using information stored on a secure stored data device.

38. A method of transactional taxation as in claim 36, further comprising the step of:
ascertaining the eligibility of the purchaser to make the purchase using information stored on a secure stored data device.

39. A method of transactional taxation as in claim 36, further comprising the step of:
collecting and storing accumulated tax collection information.

40. A method of transactional taxation as in claim 36, further comprising the step of:
accepting electronic payment of the purchase.

41. A method of transactional taxation as in claim 36, further comprising the step of:
transmitting electronic payment of the tax to the taxing authorities.

42. A method of transactional taxation comprising the steps of:
a) ascertaining the identity of a purchaser using information stored on a secure stored data device;
b) ascertaining the eligibility of the purchaser to make the purchase using information stored on a secure stored data device;

c) ascertaining the pre-tax purchase amount and sending the pre-tax purchase amount to a secure stored data device;

d) using an executable program stored in a memory of the secure stored data device to:
   i) add the pre-tax purchase amount to a total purchase history amount of the purchaser to obtain a new total purchase history amount;
   ii) compare the new total purchase history amount to a tax chart stored in the memory of the secure stored data device to ascertain a tax rate;

e) using the tax rate to determine a tax amount and a total purchase price; and f) communicating the total purchase amount to the purchaser.

43. A method of transactional taxation as in claim 42, further comprising the step of:

collecting and storing accumulated tax collection information.

44. A method of transactional taxation as in claim 42, further comprising the step of:

accepting electronic payment of the purchase.

45. A method of transactional taxation as in claim 42, further comprising the step of:

updating tax rate structure information.

46. A method of transactional taxation as in claim 42, further comprising the step of:

transmitting electronic payment of the tax to the taxing authorities.

47. A system for transactional taxation as in claim 1, wherein:

the secure stored data device is a smart card and the interface device is a smart card reader.

* * * * *